United States Patent [19]

Friedrich et al.

[11] 4,448,208

[45] May 15, 1984

[54] TOBACCO EXTRACTOR

[75] Inventors: Hermann Friedrich, Avenches; Claude Ruf, Cortaillod; Jacques Brosy, Neuchatel, all of Switzerland

[73] Assignee: Philip Morris Incorporated, New York, N.Y.

[21] Appl. No.: 340,399

[22] Filed: Jan. 18, 1982

[51] Int. Cl.³ .............................................. A24B 15/24
[52] U.S. Cl. .................................... 131/297; 131/298
[58] Field of Search ...................... 131/297; 23/293 R; 209/13, 17, 18, 160

[56] References Cited

U.S. PATENT DOCUMENTS

| | | | |
|---|---|---|---|
| 2,264,390 | 12/1941 | Levine | 23/270 |
| 2,805,667 | 9/1954 | Bethmann | 131/140 |
| 3,070,228 | 3/1961 | Hollingsworth | 209/160 |
| 3,599,645 | 3/1969 | Johnson | 131/140 |
| 3,616,801 | 10/1971 | Hind | 131/143 |
| 3,847,164 | 10/1973 | Mattina et al. | 131/143 |
| 4,131,117 | 12/1976 | Kite | 131/140 |
| 4,131,118 | 11/1976 | Gellatly et al. | 131/140 |
| 4,217,916 | 4/1979 | Emmett, Jr. et al. | 134/104 |

FOREIGN PATENT DOCUMENTS 536103 3/1955 Belgium .
512660 9/1939 United Kingdom .

Primary Examiner—V. Millin
Attorney, Agent, or Firm—Arthur I. Palmer; Nelson Blish

[57] ABSTRACT

A tobacco extractor (10) for extracting liquid and soluble constituents from cut, small plants or tobacco is disclosed. The extractor (10) consists of a worm conveyor (16) for conveying the tobacco through a V-shaped conduit (11, 12) while the wash liquid passes through the conduit in an opposite direction.

3 Claims, 1 Drawing Figure

TOBACCO EXTRACTOR

BACKGROUND OF THE INVENTION

This invention relates to an apparatus for extracting liquids and soluble constituents from plant material in general, and more particularly to an apparatus for extracting liquids and soluble constituents from tobacco.

DESCRIPTION OF THE PRIOR ART

Tobacco contains a number of substances which, during the burning of the tobacco, yield various components in the smoke. Removal of some of these smoke components may be considered desirable. For example, Keritsis U.S. Pat. No. 4,253,929, describes the removal of nitrogen containing substances so that oxides of nitrogen are not present in the smoke stream. Bethman, U.S. Pat. No. 2,805,667, describes removal of nicotine from the tobacoo. The process described in these two patents and in other patents for removing substances from tobacco, start with the first step of washing the tobacoo. Prior art methods of removing liquid and soluble constituents from the tobacco, however, have some disadvantages.

One method of removing the liquid and soluble constituents is the batch or tea bag method. However, this is unsuitable for large scale industrial processing due to the large amount of tobacco that must be processed on a continual basis for use in modern high speed cigarette manufacturing machines.

Bethman, U.S. Pat. No. 2,805,667, shows a modification of the batch process wherein tobacco is extracted with water in three consecutive steps. After each step, the tobacco is squeezed out and moved to the next vat in a series of vats while the extraction water flows in a counter-current direction. This is an improvement on the batch process, but still not capable of continuously processing tobacco at the rate required by today's high speed cigarette makers, since the tobacco must remain in each separate vat for approximately one hour.

Johnson, U.S. Pat. No. 3,599,645, describes the treatment of tobacco to reduce polyphenol content. One step of this extraction process uses a conveyor with a hold-down flight to pass the tobacco through a body of heated water. This step is used primarily to heat treat the tobacco to oxidize the polyphenol. This method would not be suitable for extraction of soluble substances from tobacco since the water flows in the same direction as the conveyor and, also, the hold-down flight does not provide sufficient liquid tobacco contact to adequately wash the tobacco.

It is, therefore, an object of the current invention to provide a tobacco extractor that is capable of processing tobacco on a continual basis.

A further object of the present invention is to provide a tobacco extractor in which the tobacco and solvent are thoroughly mixed so that the tobacco is completely washed during the extraction process.

SUMMARY OF THE INVENTION

According to the present invention, the foregoing and othe objects are attained by providing a tobacco extractor with a V-shaped conduit and a worm shaft conveyor for moving the tobacco through the conduit. The tobacco is fed at the same end of the conduit that the wash liquid is removed and the tobacco is removed at the opposite end of the conduit near the washing liquid intake, in order to provide counter-current washing.

BRIEF DESCRIPTIONS OF THE DRAWINGS

A more complete appreciation of the invention and many of the attendent advantages, thereof, will be readily apparent by reference to the following detailed description when considered in connection with the accompanying drawing wherein:

FIG. 1 is a perspective view, partially cut away, of a tobacco extractor according to the present invention.

DESCRIPTION OF THE PREFERRED EMBODIMENT

Figure 1:
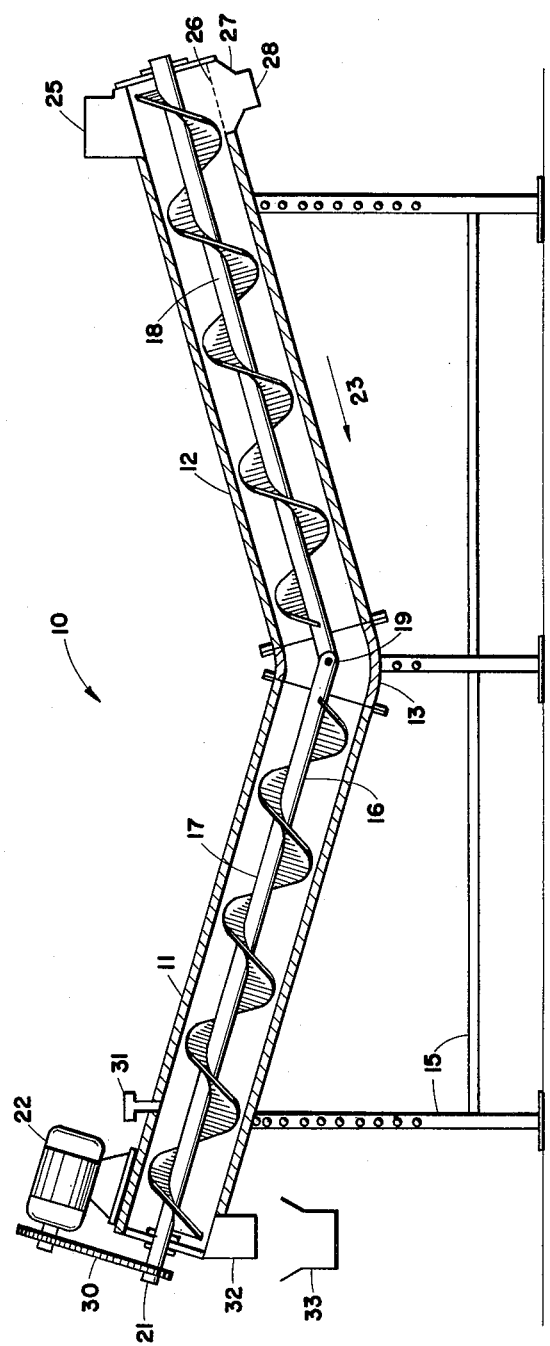

Referring now to the drawing, there is illustrated a tobacco extractor designated generally by reference numeral 10. Tobacco extractor 10 has three major components; inlet conduit 12, outlet conduit 11, and worm conveyor 16.

Inlet conduit 12 and outlet conduit 11 are two straight pipes with the same circular cross section throughout and which are joined together by bend 13. Conduits 11 and 12, and bend 13, are mounted on frame 15 so that they form an angle of approximately 160°. A pronounced downward gradient on inlet conduit 12 and a pronounced upward gradient on outlet conduit 11 have been found to be disadvantagous. It is preferable for the upward and downward slopes to have a minimum angle so that a longer portion of the extractor is completely filled with the washing liquid. A rise or fall angle with respect to the horizontal of 5° to 20° and preferably 10° has proven to be satisfactory.

Worm conveyor 16 consists of conveyor sections 17 and 18, and is mounted within, and coaxial to, conduits 11 and 12. Worm conveyor sections 17 and 18 are coupled together with cardan or universal joint 19 in the vicinity of bend 13. Worm conveyor 16 is driven by motor 22, by means of belt 30 and drive shaft 21. Worm conveyor 78 is slidably mounted in conduits 11 and 12.

Use of a worm conveyor has several advantages over other types of conveyor. One advantage is that there are no axial moving parts. Thus, there are no components of the conveyor which have to be transported in an idle condition, like empties, from the tobacco discharge and to the tobacco inlet end.

A further advantage of the worm conveyor is that the spirals have a pumping and squeezing action on the tobacco as the tobacco is compressed and stress relieved again to varying degrees by the spirals. The pumping action has proven to be advantageous to the extraction process.

Hopper 25, at the upper end of inlet conduit 12, is used for loading plant material or tobacco to be washed out. Extract discharge line 28 is located opposite hopper 25 also at the upper end of inlet conduit 12. Extract discharge 28 consists of collecting funnel 27 and sieve 26. Sieve 26 prevents tobacco from being removed from extractor 26 with the extract liquid. The lower edge of sieve 26 defines the overflow level for the washing liquid overflow, insuring that a certain liquid level is maintained in the extractor 10. Thus, tobacco will be completely immersed in the washing liquid at some point between tobacco inlet hopper 25 and tobacco discharge 32.

Washing liquid feed connection 31 is attached to the upper end of outlet conduit 11. Tobacco discharge 32 is located approximately opposite washing liquid feed connection 31. Tobacco is discharged through discharge 32 into collecting tank 33. Tobacco discharge 32 is located at a position on outlet conduit 11 so that it is above the liquid level defined by sieve 26.

Tobacco transverses through the extractor in a direction indicated by arrow 23. The washing liquid flows in the opposite direction entering at wash liquid feed connection 31 and leaving extractor 10 at extractor discharge 28. In the preferred embodiment, tobacco is fed through the extractor at 6 to 15 kg per hour and preferrably at 10 kg per hour and liquid is fed through the extractor at 60 to 150 liters per hour and preferably at 100 liters per hour.

The washing liquid can be water or water mixed with additives, for example, potasium phosphate. The washing liquid can also be constituted by a solvent other than water, for example methyl alcohol or a mixture of any of the afore mentioned liquids.

It is thus seen that a tobacco extractor constructed in accordance with the present invention may be used to process tobacco on a continuous basis while providing maximum contact between the washing liquid and the tobacco.

We claim:

1. An extractor comprising:
   a downwardly sloping inlet conduit;
   an upwardly sloping outlet conduit connected to said downwardly sloping conduit at their lowest portions;
   a worm conveyor coaxially mounted in said inlet and outlet conduit;
   a plant material inlet mounted at the upper end of said inlet conduit;
   a plant material outlet at the upper end of said outlet conduit;
   an extract discharge line mounted at the upper end of said inlet conduit; and
   a wash liquid feed connection mounted at the upper end of said outlet conduit.

2. An extractor according to claim 1 wherein said inlet conduit and said outlet conduit meet at an angle of approximately 140° to 170°.

3. An extractor according to claim 1 wherein said worm conveyor is comprised of two worm conveyor sections connected by a cardan joint at the lowest portion of said extractor.

* * * * *

UNITED STATES PATENT AND TRADEMARK OFFICE
CERTIFICATE OF CORRECTION

PATENT NO. : 4,448,208
DATED : May 15, 1984
INVENTOR(S) : Hermann Friedrich, Claude Ruf and Jacques Brosy It is certified that error appears in the above—identified patent and that said Letters Patent is hereby corrected as shown below:

Cover page, line [73] assignee "Philip Morris Incorporated, New York, N.Y." should be changed to --Fabriques de Tabac Reunies S.A., Neuchatel, Switzerland--.

Signed and Sealed this

Twenty-fifth Day of September 1984

[SEAL]

Attest:

GERALD J. MOSSINGHOFF

Attesting Officer — Commissioner of Patents and Trademarks

UNITED STATES PATENT AND TRADEMARK OFFICE
CERTIFICATE OF CORRECTION

PATENT NO. : 4,448,208
DATED : May 15, 1984
INVENTOR(S) : Hermann Friedrich, Claude Ruf and Jacques Brosy It is certified that error appears in the above-identified patent and that said Letters Patent is hereby corrected as shown below:

Cover page, line [30], insert:

--       Foreign Application Priority Data

Jan. 21, 1981 [DE] Fed. Rep. of Germany ... 31 01 768 --

Signed and Sealed this

Fifth Day of March 1985

[SEAL]

*Attest:*

DONALD J. QUIGG

*Attesting Officer*     *Acting Commissioner of Patents and Trademarks*